United States Patent
Lee

(10) Patent No.: US 8,123,390 B2
(45) Date of Patent: Feb. 28, 2012

(54) BACKLIGHT ASSEMBLY AND LIQUID CRYSTAL DISPLAY APPARATUS HAVING THE SAME

(75) Inventor: Yong-Woo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 891 days.

(21) Appl. No.: 11/158,999

(22) Filed: Jun. 22, 2005

(65) Prior Publication Data

US 2006/0018130 A1 Jan. 26, 2006

(30) Foreign Application Priority Data

Jul. 21, 2004 (KR) .................. 10-2004-0056813

(51) Int. Cl.
*F21V 7/041* (2006.01)

(52) U.S. Cl. ............ 362/600; 362/26; 362/27; 362/611; 362/613; 362/614

(58) Field of Classification Search ................ 362/600, 362/26, 27, 611, 613, 614, 632, 634, 225, 362/249, 396, 224
See application file for complete search history.

(56) References Cited

U.S. PATENT DOCUMENTS

| | | | | |
|---|---|---|---|---|
| 6,749,315 B2* | 6/2004 | Moon et al. | | 362/97 |
| 2003/0043314 A1* | 3/2003 | Lee et al. | | 349/65 |
| 2003/0086255 A1 | 5/2003 | Moon et al. | | |
| 2005/0073858 A1* | 4/2005 | Kim et al. | | 362/561 |
| 2005/0152124 A1* | 7/2005 | Tsai | | 362/30 |

FOREIGN PATENT DOCUMENTS

| | | |
|---|---|---|
| JP | 1988-175310 U | 11/1988 |
| JP | 1994-038113 U | 5/1994 |
| JP | 2001-210126 | 8/2001 |
| JP | 2003-346541 | 12/2003 |
| KR | 0313159 Y1 | 4/2003 |
| KR | 0354843 Y1 | 6/2004 |
| KR | 1020040057712 A | 7/2004 |

* cited by examiner

*Primary Examiner* — Jong-Suk (James) Lee
*Assistant Examiner* — Mark Tsidulko
(74) *Attorney, Agent, or Firm* — Cantor Colburn LLP

(57) ABSTRACT

A backlight assembly includes a plurality of lamps, a receiving container, a diffuser plate and a plurality of holding members. The lamps generate a light. The receiving container receives the lamps. The receiving container includes a bottom portion and a side portion protruded from a side of the bottom portion. The diffuser plate is over the lamps to diffuse the light generated from the lamps. The holding members are engaged with the bottom portion. Each of the holding members has a lamp holding portion that holds one of the lamps. 10 The lamp holding portion has an opening for receiving the lamp. The opening is inclined by a first angle with respect to a normal line of the bottom portion. Therefore, the lamps are securely combined with the lamp holding portion, and the lamps are easily assembled to protect the lamps from an externally provided impact.

25 Claims, 6 Drawing Sheets

BACKLIGHT ASSEMBLY AND LIQUID CRYSTAL DISPLAY APPARATUS HAVING THE SAME

CROSS REFERENCE OF RELATED APPLICATION

The present application claims priority from Korean Patent Application No. 2004-56813, filed on Jul. 21, 2004, the disclosure of which is hereby incorporated herein by reference in its entirety.

BACKGROUND OF THE INVENTION

1. Field of the Invention

The present invention relates to a backlight assembly and a liquid crystal display apparatus. More particularly, the present invention relates to a backlight assembly capable of preventing lamp breakage and a liquid crystal display apparatus having the backlight assembly.

2. Description of the Related Art

In general, liquid crystal display apparatuses, a type of flat panel display apparatus, display images using liquid crystal. The liquid crystal display apparatuses have advantageous characteristics, including, for example, thin thickness, low driving voltage, low power consumption, etc., and is widely applied to various electronic instruments.

The liquid crystal display apparatus is a non-emissive type display apparatus and thus includes a backlight assembly that generates a light.

The backlight assembly includes a lamp that generates light. One type of lamp usable in the backlight assembly is a cold cathode fluorescent lamp ("CCFL") having a long cylindrical shape. The backlight assembly having the CCFL is classified as either an edge-illumination type backlight assembly or a direct-illumination type backlight assembly. In the edge-illumination type backlight assembly, the lamp is positioned adjacent to a side surface of a transparent light guide plate, and light generated from the lamp is reflected from the light guide plate toward a liquid crystal display panel. In the direct-illumination type backlight assembly, a plurality of lamps are under the liquid crystal display panel, a diffuser plate is disposed between the lamps and the liquid crystal display panel and a reflecting plate is disposed under the lamps. Light generated from the lamps is reflected from the reflecting plate and diffused by the diffuser plate. The diffused light is irradiated onto the liquid crystal display panel. The direct-illumination type backlight assembly may have wider brightness than the edge-illumination type backlight assembly. Therefore, a small screen liquid crystal display apparatus has the edge-illumination type backlight assembly, and a large screen liquid crystal display apparatus has the direct-illumination type backlight assembly.

In the direct-illumination type backlight assembly, a length of the lamps and a size of the diffuser plate increase the volume of the backlight assembly. The backlight assembly further includes a holding member that fixes the lamps and supports the diffuser plate. The lamps are combined with the holding member in a perpendicular direction with respect to the diffuser plate.

However, the lamps are easily separated from the holding member by an impact that is provided outside of the backlight assembly, which can result in breakage of the lamps. If an opening width of the holding member is too small, the lamps are not easily combined with the holding member, but if the opening width of the holding member is too large, the lamp is easily separated from the holding member.

SUMMARY OF THE INVENTION

The present invention provides a backlight assembly capable of preventing lamp breakage.

The present invention also provides a liquid crystal display apparatus having the above-mentioned backlight assembly.

A backlight assembly in accordance with an exemplary embodiment of the present invention includes a plurality of lamps, a receiving container, a diffuser plate and a plurality of holding members. The lamps generate a light. The receiving container receives the lamps, and includes a bottom portion and a side portion that is protruded from a side of the bottom portion. The diffuser plate is disposed over the lamps to diffuse the light generated from the lamps. The holding members are engaged with the bottom portion, and each of the holding members has a lamp holding portion that holds one of the plurality of lamps. The lamp holding portion has an opening for receiving the lamp, and the opening is inclined by a first angle with respect to a normal line of the bottom portion. The first angle is within a range of about 5° to about 60°. An opening width of the opening is within a range of about 80% to about 90% of a diameter of the lamp. Each of the holding members further comprises a diffuser plate supporting portion that supports the diffuser plate.

A liquid crystal display apparatus in accordance with an exemplary embodiment of the present invention includes a backlight assembly, a liquid crystal display panel, an inverter and a top chassis. The backlight assembly includes a plurality of lamps that generate a light, a receiving container that has a bottom portion and a side portion to receive the lamps, a diffuser plate disposed over the lamps to diffuse the light generated from the lamps and a plurality of holding members engaged with the bottom portion. Each of the holding members has a lamp holding portion that holds one of the plurality of lamps, and the lamp holding portion has an opening for receiving the lamp. The opening is inclined by a first angle with respect to a normal line of the bottom portion. The liquid crystal display panel displays an image using the light from the backlight assembly. The inverter generates driving voltages for driving the lamps. The top chassis fixes the liquid crystal display panel to the backlight assembly.

In one exemplary embodiment of a lamp holding portion for a backlight assembly, the lamp holding portion includes a first lamp holding portion having a first opening, a first jaw, and a second jaw, the first jaw spaced from the second jaw by a first distance in a biased condition, the first jaw and the second jaw separable by a second distance greater than the first distance for allowing entry of a lamp through the first opening. The first jaw has a shorter length than a length of the second jaw for offsetting the first opening from a line perpendicular to a bottom portion of the backlight assembly.

Therefore, the lamp is securely contained within the lamp holding portion to protect the lamp from an externally provided impact. Also, the opening width of the opening is increased so that the lamp is easily assembled.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
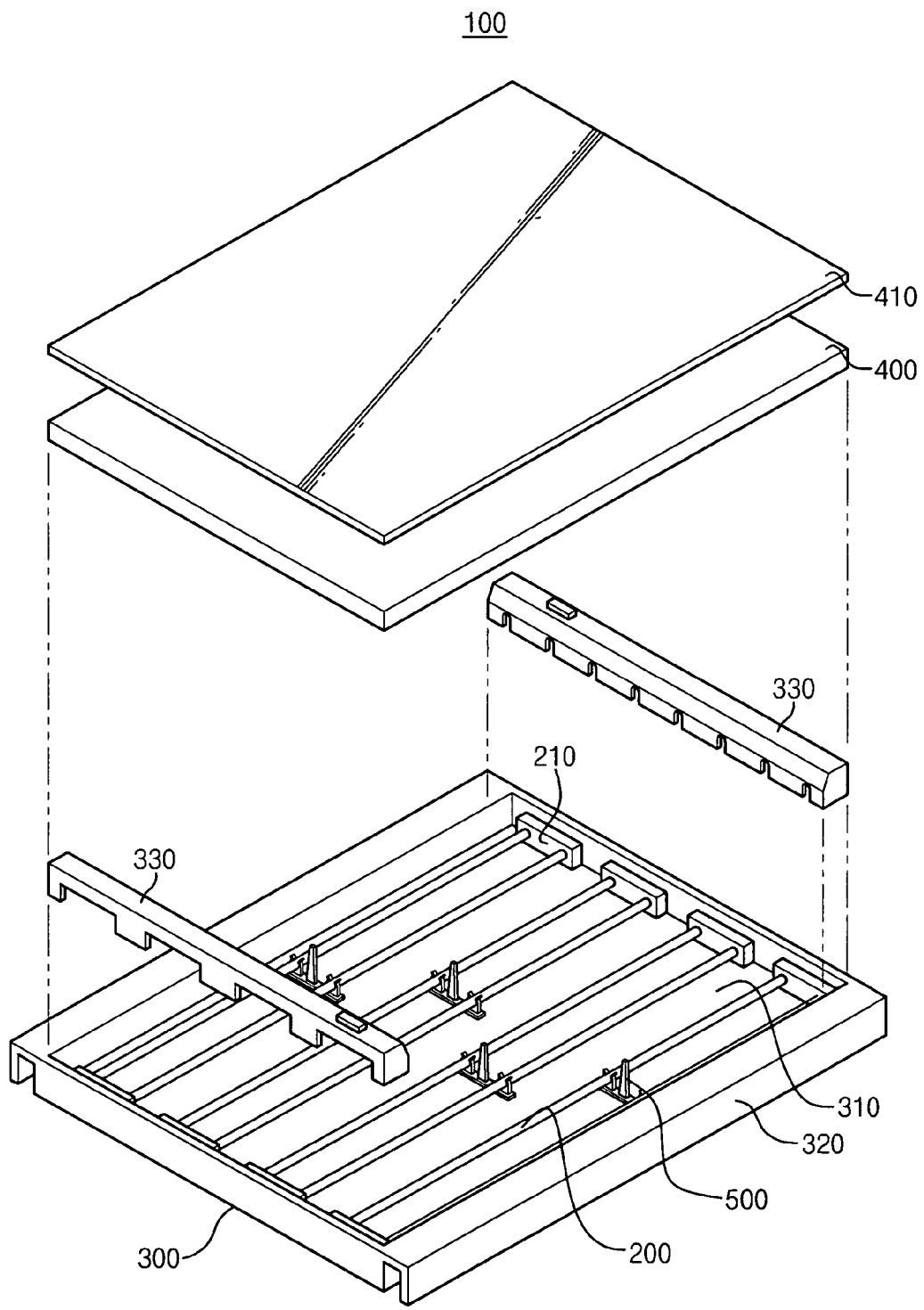
FIG. 1 is an exploded perspective view illustrating an exemplary embodiment of a backlight assembly in accordance with the present invention.

It should be understood that the exemplary embodiments of the present invention described below may be modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Hereinafter, the present invention will be described in detail with reference to the accompanying drawings.

Figure 2:
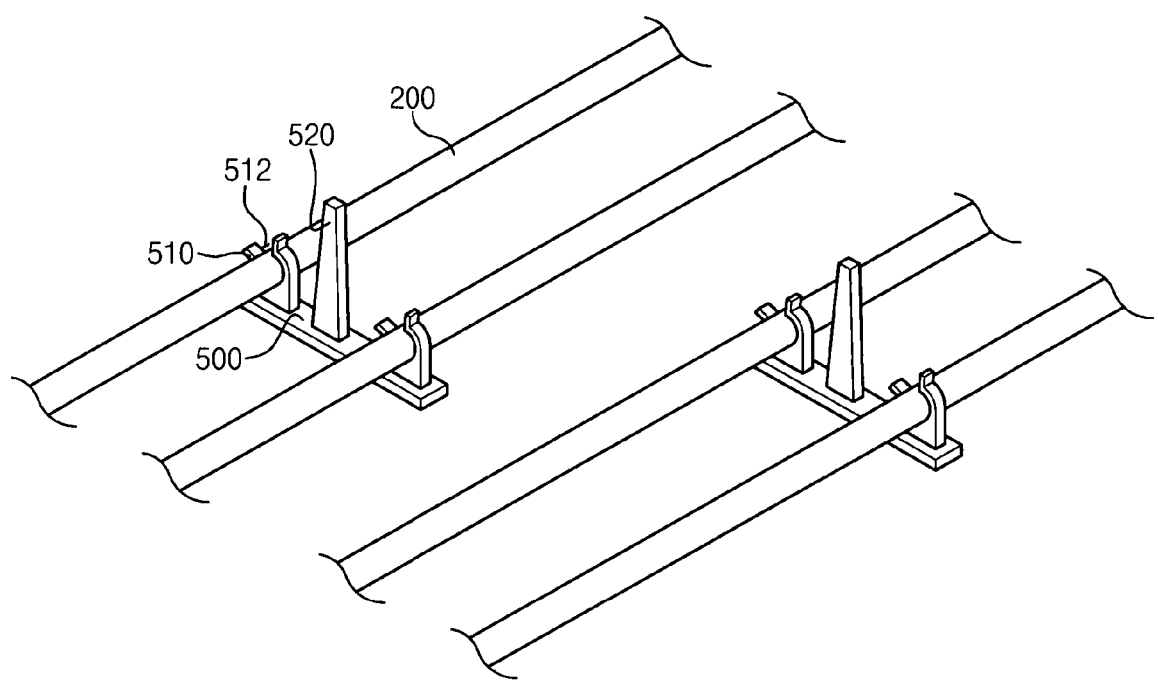
FIG. 2 is a perspective view illustrating holding members and lamps shown in FIG. 1.

FIG. 1 is an exploded perspective view illustrating an exemplary embodiment of a backlight assembly in accordance with the present invention, and FIG. 2 is a perspective view illustrating holding members and lamps shown in FIG. 1.

Referring to FIGS. 1 and 2, a backlight assembly 100 includes a plurality of lamps 200, a receiving container 300, a diffuser plate 400 and a plurality of lo holding members 500.

Each of the lamps 200 generates light. The lamps 200 are under the diffuser plate 400 and substantially parallel with each other. The lamps 200 are positioned between a bottom portion 310 of a receiving container 300 and the diffuser plate 400. In one exemplary embodiment, each of the lamps 200 is a cold cathode fluorescent lamp ("CCFL") having a long cylindrical shape. Alternatively, each of the lamps 200 may be an external electrode fluorescent lamp ("EEFL") having a long cylindrical shape. While particular embodiments of the lamps 200 have been described, it should be understood that alternate lamp embodiments are also within the scope of this backlight assembly 100. In this embodiment, the backlight assembly 100 further includes lamp holders 210 that fix the lamps 200 to the receiving container 300. The lamp holders 210 hold end portions of the lamps 200 to fix the lamps 200 to the receiving container 300. The lamp holders 210 may come in pairs, where a first lamp holder member is positioned on a first side portion 320 of the receiving container 300. A second side portion 320, parallel to the first side portion 320, is where a second lamp holder member is positionable. Thus, it can be understood from FIG. 1 that a first lamp holder member of the lamp holder 10 holds a first end portion of a lamp or lamps 200 and a second lamp holder member of the lamp holder 210 holds a second end portion of a lamp or lamps 200. A longitudinal axis of each of the lamps 200 may extend perpendicularly with respect to the first and second side portions 320. The lamp holders 210 are combined with the receiving container 300. For example, one lamp holder 210 fixes two lamps 200 to the receiving container 300, although, in alternate embodiments, each lamp holder 210 may hold more or less than two lamps 200.

The receiving container 300 includes a bottom portion 310 and four side portions 320 extending from a periphery of the bottom portion 310 so as to form a receiving space. Two of the side portions 320 that are substantially in parallel with each other and parallel to a longitudinal axis of the lamps 200 have a bent structure of a U-shape, that is, the cross-sectional shape of the two side portions 320 has an inverted U-shape as shown. Alternatively, the four side portions 320 may have the bent structure of the U-shape. By example only, the receiving container 300 is made of strong metal.

The diffuser plate 400 is over the lamps 200. That is, the diffuser plate 400 is positioned between the lamps 200 and the optical sheet 410. The diffuser plate 400 has a substantially quadrangular plate shape having a predetermined thickness. The diffuser plate 400 diffuses the light generated from the lamps 200 to enhance brightness uniformity of the light. For example, the diffuser plate 400 includes a Poly(Methyl Methacrylate) ("PMMA"). PMMA, a member of the acrylic family, is a clear and rigid plastic having a high degree of transparency and is often used as a shatterproof replacement for glass. The diffuser plate 400 may include a diffusate for diffusing the light that is incident into the diffuser plate 400.

The holding members 500 are combined with, or otherwise engaged with, the bottom portion 310 of the receiving container 300. Each of the holding members 500 includes at least one lamp holding portion 510 that holds a lamp 200. The lamp holding portion 510 has an opening 512 into which the lamp 200 is inserted. The opening 512 is inclined by a predetermined angle with respect to a normal line NL of the bottom portion 310, where the normal line NL is a line extending perpendicular from a plane of the bottom portion 310. Each of the holding members 500 further includes at least one diffuser plate supporting portion 520. The diffuser plate supporting portion 520 has a greater length extending towards the diffuser plate 400 than a length extending towards the diffuser plate 400 of the lamp holding portion 510, so that the diffuser plate supporting portion 520 supports the diffuser plate 400.

In this embodiment, each of the holding members 500 includes two lamp holding portions 510 and one diffuser plate supporting portion 520. The diffuser plate supporting portion 520 is disposed between two lamp holding portions 510. Alternatively, the holding member 500 may include no less than three lamp holding portions 510. For example, when the holding member 500 includes four lamp holding portions 510, two lamp holding portions 510 are at both sides of the diffuser plate supporting portion 520, respectively. In yet another embodiment, the holding member 500 could include more than one diffuser plate supporting portion 520.

The holding members 500 are arranged in a zigzag shape along a direction that is substantially perpendicular to a longitudinal direction of the lamp 200. By a "zigzag shape", it can be seen from FIG. 1 that the holding members 500 are arranged at varying distances from a first side portion 320. In one embodiment, alternating holding members 500 may be arranged at a first distance from the first side portion 320, while the remaining holding members 500 interposed between the alternating holding members 500 may be arranged at a second distance from the first side portion 320, wherein the first distance and the second distance are different. When the holding members 500 are arranged in a straight shape along the direction that is substantially perpendicular to the longitudinal direction of the lamp 200, such as positioned equally distant from a first side portion 320, a quality defect such as a dark line may occur along the holding members 500. Thus, the holding members 500 are arranged in the zigzag shape so as to improve an image display quality.

In this embodiment, each of the lamps 200 is fixed to each of the lamp holding portions 510. Alternatively, when a length of the lamps 200 is very long, each of the lamps 200 may be fixed to no less than two lamp holding portions 510. That is, there may be more than one holding member 500 for each set of lamps held therein. The holding members 500 may be spaced apart along the longitudinal axis of the lamp for maximum support.

The backlight assembly 100 may further include at least one optical sheet 410 that is on the diffuser plate 400. The optical sheet 410 enhances brightness uniformity or brightness when viewed from a front of the backlight assembly 100 of the diffused light that is diffused from the diffuser plate 400. A front of the backlight assembly 100 may be defined as opposite a rear of the backlight assembly 100, where the bottom portion 310 of the backlight assembly 100 is adjacent the rear of the backlight assembly 100. By example only, the optical sheet 410 may include a diffuser sheet that diffuses the light, a prism sheet that improves the brightness when viewed from the front of the backlight assembly 100, etc.

The backlight assembly 100 may further include side molds 330 that are at first and second end portions of the lamps 200. The side molds 330 are combined with the receiving container 300 so as to cover each end portion of the lamps 200. The side molds 330 cover electrode portions of the lamps 200 so as to uniformize brightness of the light. The side molds 330 support sides of the diffuser plate 400, and guide the diffuser plate 400 onto a receiving position of the side molds 330.

Figure 3:
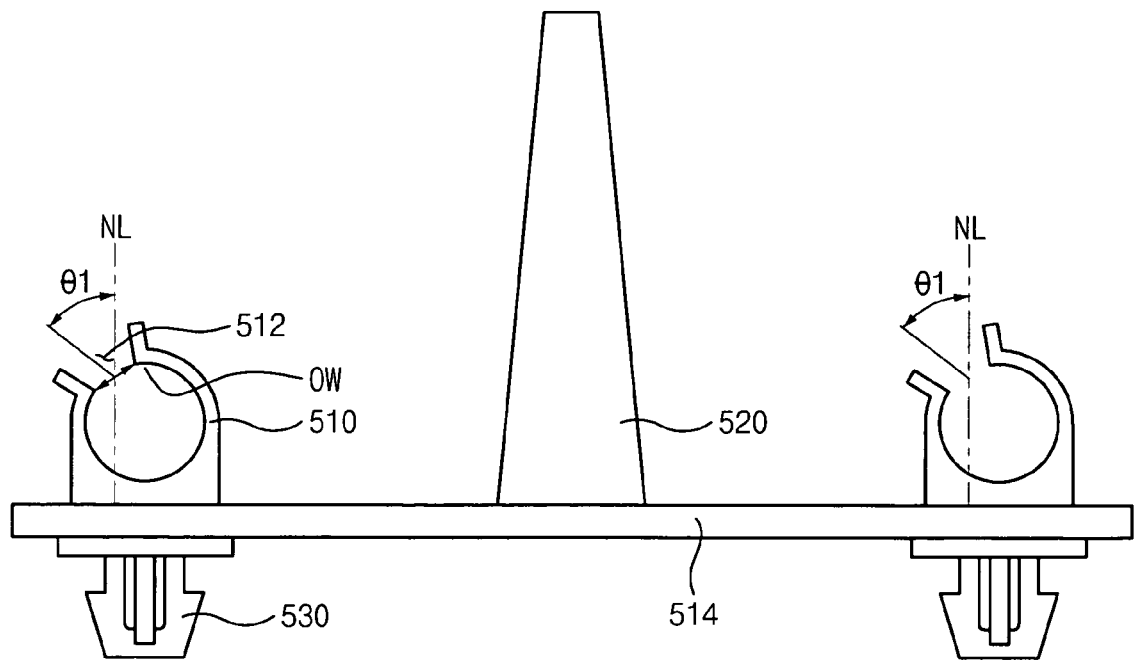
FIG. 3 is a side plan view illustrating a holding member shown in FIG. 1.

FIG. 3 is a plan view illustrating a holding member shown in FIG. 1.

Referring to FIGS. 1 and 3, the holding member 500 includes the lamp holding portions 510 that hold the lamps 200 and the diffuser plate supporting portion 520 that supports the diffuser plate 400. In the illustrated embodiment, the lamp holding portions 510 and the diffuser plate supporting portion 520 are connected to each other by a connecting bar 514. The diffuser plate supporting portion 520 includes a first end attached to the connecting bar 514 and a second end, where the second end is capable of abutting the diffuser plate 400 for support thereof. Also, the holding member 500 further includes a combining portion 530 that is combined with, or otherwise engaged with, the receiving container 300. The combining portion 530 is fixed to an outer surface of the receiving container 300 through the bottom portion 310 so as to fix the holding member 500 to the receiving container 300. That is, the bottom portion 310 may include apertures sized for receiving a prong of the combining portion 530 from the lamp holding portions 510 as illustrated, or from any other location along the connecting bar 514. After the prongs from the holding member 500 are inserted into the bottom portion 310, the retaining portion of the combining portions 530, which are too large to pass through the apertures within the bottom portion 310, may be attached to the prongs thereby securing the connecting bar 514 of the holding member 500 to the bottom portion 310.

In this exemplary embodiment, the diffuser plate supporting portion 520 is at a center of the holding member 500, and two lamp holding portions 510 are at both sides of the diffuser plate supporting portion 520, respectively. The diffuser plate supporting portion 520 supports the diffuser plate 400 so that the diffuser plate 400 is spaced apart from the lamps 200 by a constant distance.

The lamp holding portion 510 includes the opening 512 into which the lamp 200 is inserted. The opening 512 is inclined by a first angle θ1 with respect to a normal line NL of the bottom portion 310. The first angles θ1 of the openings 512 of the lamp holding portions 510 are substantially identical to each other. For example, when the backlight assembly 100 is set up, the openings 512 are upwardly inclined, generally towards a side facing the diffuser plate 400 rather than a side facing the bottom portion 310. The first angle θ1 has a range of about 5° to about 60°. In this exemplary embodiment, the first angle θ1 is about 30°.

An opening width OW of the opening 512 is determined by a diameter of the lamp 200. When the opening width OW is increased, the lamp 200 is easily inserted into the lamp holding portion 510. However, when the opening width OW is too large, the lamp 200 may be easily separated from the lamp holding portion 510. Therefore, the opening width OW of the opening 512 has a range of about 80% to about 90% of the diameter of the lamp 200 to prevent an inadvertent separation of the lamp 200 from a lamp holding portion 510. When the opening width OW of the opening 512 is smaller than about 80% of the diameter of the lamp 200, the lamp 200 may not be easily inserted into the opening 512, and the lamp 200 may be broken during insertion. Each lamp holding portion 510 includes two receiving jaws that are biased in a resting position to the opening width OW of the opening 512. The receiving jaws may be partially separated, such as by a small force, to a width greater than the opening width OW, thereby temporarily enlarging the opening 512, in order to allow entry of the lamp 200 therebetween. After removal of the separating force from the receiving jaws, such as when the lamp 200 is received within the lamp holding portion 510, the receiving jaws may naturally be spring biased back to the position where they are separated by the opening width OW.

EXAMPLE 1

In a backlight assembly employed in LCD television receiver sets (TVs) such as 26 inch, 32 inch and 40 inch LCD TVs, the backlight assembly of FIGS. 1 to 3 was employed. The opening 512 of a lamp holding portion 510 was inclined by 300 with respect to a normal line NL of a bottom portion 310. A diameter of a lamp 200 was 4 mm, and an opening width OW of the opening 512 was 3.3 mm, thus, the opening width OW was 82.5% of the diameter of the lamp 200. When the lamp 200 was inserted into a lamp holding portion 510, the lamp 200 was not separated from the lamp holding portion 510 under a condition of an impact simulation that has an impact speed of 50 G and an impact time of 11 ms. The G is a gravitational acceleration.

Thus, in Example 1, the opening 512 was inclined by 30° with respect to a normal line NL of a bottom portion 310, the opening width OW was 82.5% of the diameter of the lamp 200, and the lamp 200 was not separated from the lamp holding portion 510.

COMPARATIVE EXAMPLE 1

In a backlight assembly employed in LCD television receiver sets (TVs) such as 26 inch, 32 inch and 40 inch LCD TVs, the backlight assembly is substantially the same as the backlight assembly 100 in FIGS. 1 to 3 except that the backlight assembly for this example included a different arrangement for an opening of a lamp holding portion.

The opening of the lamp holding portion was arranged in a direction substantially parallel with a normal line NL of the bottom portion, the diameter of the lamp was 4 mm, and the opening width of the opening was 3.4 mm. As a result of the impact simulation having an impact speed of 50 G and an impact time of 11 ms, the lamp was separated from the lamp holding portion. However, when the opening width of the opening was 3.0 mm, the lamp was not separated from the lamp holding portion. In other words, when the opening width was 75% with respect to the diameter of the lamp, the lamp was not separated from the lamp holding portion, however, when the opening width was 85% with respect to the diameter of the lamp, the lamp was separated from the lamp holding portion.

COMPARATIVE EXAMPLE 2

In a backlight assembly employed in an LCD TV of 42 inch, the backlight assembly is substantially the same as the backlight assembly 100 in FIGS. 1 to 3 except that the backlight assembly for this example included a different arrangement for an opening of a lamp holding portion.

The opening of the lamp holding portion was arranged in a direction substantially parallel with a normal line NL of the bottom portion, the diameter of the lamp was 4 mm, and the opening width of the opening was 3.3 mm. As a result of the impact simulation having an impact speed of 50 G and an impact time of 11 ms, the lamp was separated from the lamp holding portion. However, when the opening width of the opening was 3.0 mm, the lamp was not separated from the lamp holding portion. That is, when the opening width was 75% with respect to the diameter of the lamp, the lamp was not separated from the lamp holding portion, however, when the opening width was 82.5% with respect to the diameter of the lamp, the lamp was separated from the lamp holding portion.

COMPARATIVE EXAMPLE 3

In a backlight assembly employed in an LCD TV of 46 inch, the backlight assembly is substantially the same as the backlight assembly 100 in FIGS. 1 to 3 except that the backlight assembly for this example included a different arrangement for an opening of a lamp holding portion.

The opening of the lamp holding portion was arranged in a direction substantially parallel with a normal line NL of the bottom portion, the diameter of the lamp was 4 mm, and the opening width of the opening was 3 mm. As a result of the impact simulation having an impact speed of 50 G and an impact time of 11 ms, the lamp was separated from the lamp holding portion. However, when the opening width of the opening was 2.8 mm, the lamp was not separated from the lamp holding portion. That is, when the opening width was 70% with respect to the diameter of the lamp, the lamp was not separated from the lamp holding portion, however, when the opening width was 75% with respect to the diameter of the lamp, the lamp was separated from the lamp holding portion.

Referring to Comparative Examples 1, 2 and 3, when the opening of the lamp holding portion was arranged in a direction substantially parallel with a normal line NL of the bottom portion, and the opening width of the opening exceeded 80% of the diameter of the lamp, the lamp was easily separated from the lamp holding portion by an externally provided impact. In addition, although the opening width was 75% of the diameter of the lamp, the lamp was separated from the lamp holding portion of a backlight assembly employed in the LCD TV of 46 inch. Thus, the type of display that the backlight assembly is employed within should be considered when selecting an opening width for the lamp holding portion. Also, an inclination of the opening 512 as described with respect to Example 1 assists in the prevention of inadvertent lamp separation.

Figure 4:
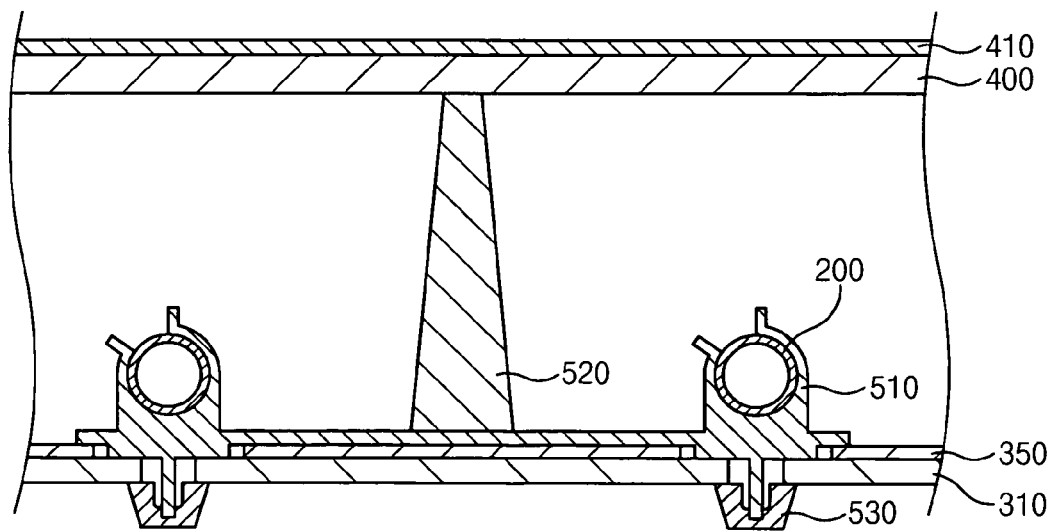
FIG. 4 is a cross-sectional view illustrating the backlight assembly shown in FIG. 1.

FIG. 4 is a cross-sectional view illustrating the backlight assembly shown in FIG. 1.

Referring to FIG. 4, the backlight assembly 100 further includes a reflecting plate 350 that is on the bottom portion 310 of the receiving container 300. The reflecting plate 350 reflects light generated from the lamp 200 towards the diffuser plate 400 to improve the brightness of the backlight assembly 100.

The reflecting plate 350 and the bottom portion 310 of the receiving container 300 include apertures corresponding to the prongs of the combining portions 530 of the holding member 500. The combining portion 530 is combined with the receiving container 300 through the opened portions of the reflecting plate 350 and the bottom portion 310. The reflecting plate 350 may be positioned between the bottom portion 310 and the connecting bar 314 as shown.

The lamp 200 is fixed to the lamp holding portion 510, so that the lamp 200 is spaced apart from the reflecting plate 350 by a predetermined distance.

The diffuser plate supporting portion 520 is higher than the lamp holding portion 510 with respect to the connecting bar 514. That is, the diffuser plate supporting portion 520 is protruded from the lamp holding portion 510. The diffuser plate 400 is on the diffuser plate supporting portion 520, and the optical sheet 410 is on the diffuser plate 400. The diffuser plate supporting portion 520 supports the diffuser plate 400 to prevent a sagging of the diffuser plate 400, so that the lamp 200 is spaced apart from the diffuser plate 400 by a constant distance.

Figure 5:
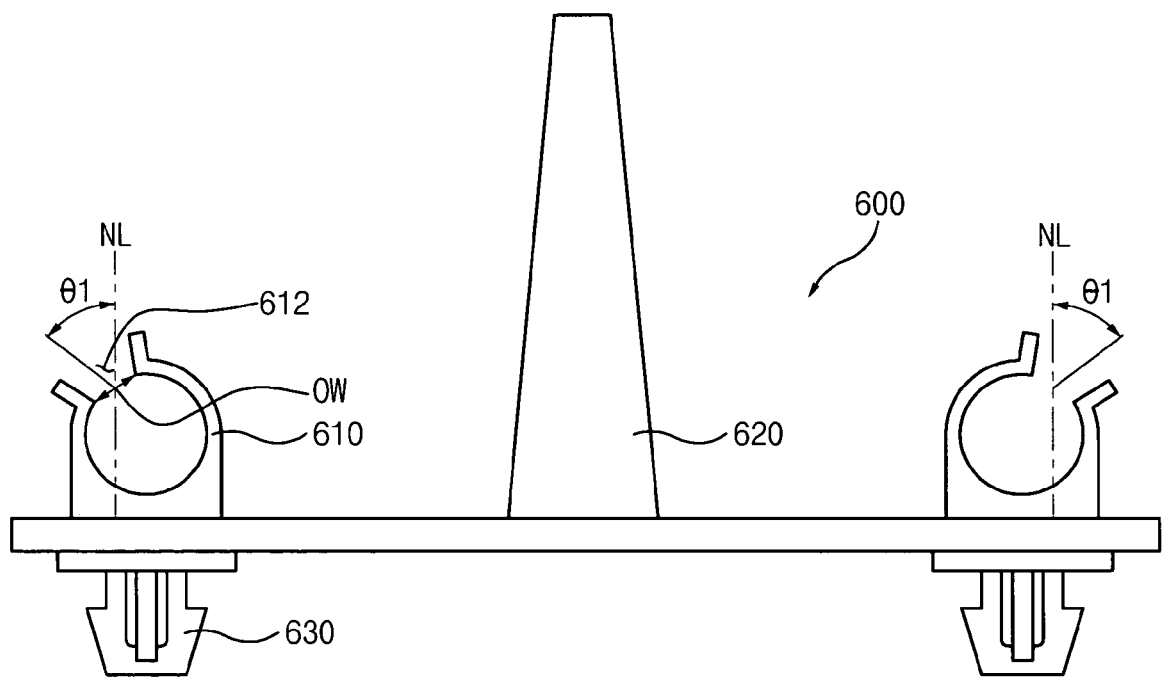
FIG. 5 is a side plan view illustrating another exemplary embodiment of a holding member in accordance with the present invention for use in the backlight assembly of FIG. 1.

FIG. 5 is a plan view illustrating another exemplary embodiment of a holding member in accordance with the present invention.

Referring to FIG. 5, a holding member 600 includes a lamp holding portion 610, a diffuser plate supporting portion 620 and a combining portion 630.

The diffuser plate supporting portion 620 is at a center of the holding member 600, and two lamp holding portions 610 are at both sides of the diffuser plate supporting portion 620, respectively. The diffuser plate supporting portion 620 is higher than the lamp holding portions 610 to support the diffuser plate 400. Lamps 200 fixed to the lamp holding portions 610 are spaced apart from the diffuser plate 400 by the diffuser plate supporting portion 620 at a constant distance.

Each of the lamp holding portions 610 has an opening 612 for receiving each of the lamps 200. The opening 612 is inclined by a first angle θ1 with respect to a normal line NL of the bottom portion 310. The openings 612 are inclined toward opposite sides with respect to the diffuser plate supporting portion 620. For example, a left-sided opening 612 of the lamp holding portion 610, which is on a left side of the diffuser plate supporting portion 620, is inclined to the left side. In addition, a right-sided opening 612 of the lamp holding portion 610, which is on a right side of the diffuser plate supporting portion 620, is inclined to the right side. In this embodiment, the first angle θ1 has a range of about 5° to about 60°. In this exemplary embodiment, the first angle θ1 is about 30°. An opening width OW of the opening 612 is determined by a diameter of each of the lamps 200. When the opening width OW is increased, the lamp 200 is easily inserted into the lamp holding portion 610. However, when the opening width OW is too large, the lamp 200 may by easily separated from the lamp holding portion 610. Therefore, the opening width OW of the opening 612 has a range of about 80% to about 90% of the diameter of the lamp 200 to prevent a separation of the lamp 200 from the lamp holding portion 610.

The holding member 600 may have no less than four lamp holding portions 610. For example, when the holding member 600 has four lamp holding portions 610, the lamp holding portions 610 are at both sides of the diffuser plate supporting portion 620, respectively. The openings 612 of two of the lamp holding portions 610 disposed at a left side of the diffuser plate supporting portion 620 are inclined to the left side, and the openings 612 of remaining two of the lamp holding portions 610 disposed at a right side of the diffuser plate supporting portion 620 are inclined to the right side. Alternate arrangements of the holding portions 610 with respect to the diffuser plate supporting portion 620 would also be within the scope of this embodiment.

Figure 6:
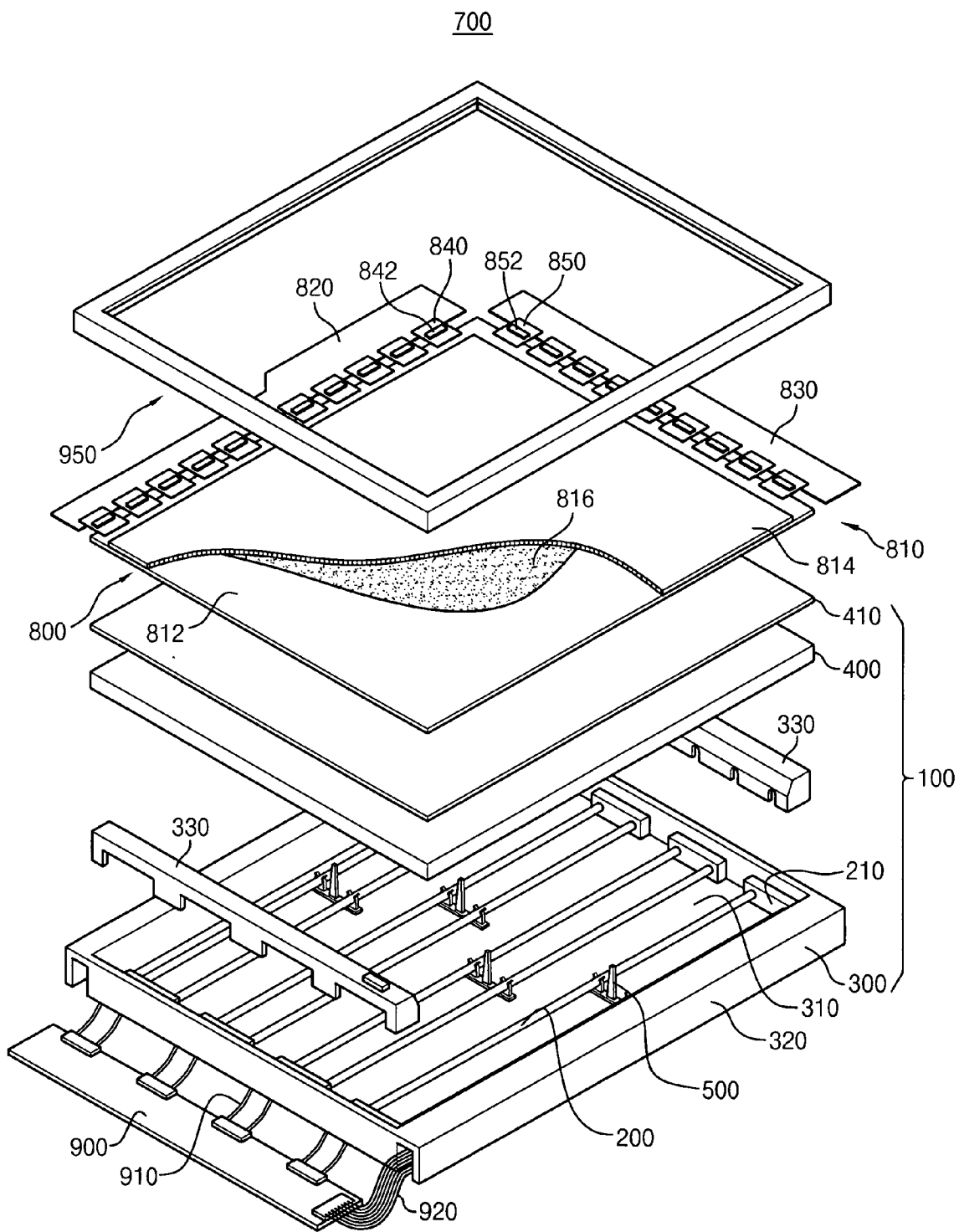
FIG. 6 is an exploded perspective view illustrating an exemplary embodiment of a liquid crystal display apparatus in accordance with the present invention.
Figure 7:
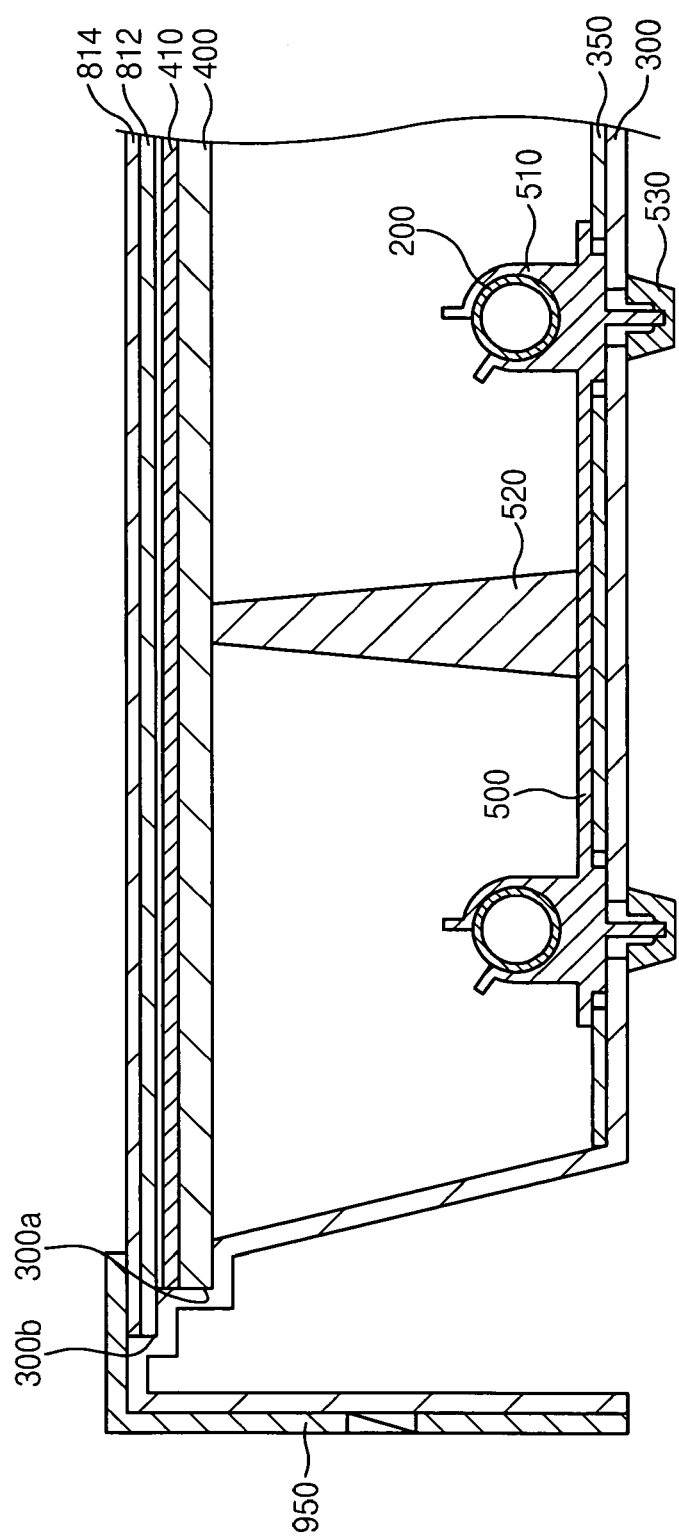
FIG. 7 is a cross-sectional view illustrating the liquid crystal display apparatus shown in FIG. 6.

FIG. 6 is an exploded perspective view illustrating an exemplary embodiment of a liquid crystal display ("LCD") apparatus in accordance with the present invention, and FIG. 7 is a cross-sectional view illustrating the liquid crystal display apparatus shown in FIG. 6. The backlight assembly of FIGS. 6 and 7 is same as in FIGS. 1 to 4. Thus, the same reference numerals will be used to refer to the same or like parts as those described in FIGS. 1 to 4 and any further explanation will be omitted. It should be noted that the LCD apparatus of the present invention might employ one of the above-described embodiments of the holding member of the present invention and their equivalents. For example, although FIG. 7 shows openings 512 as arranged in FIGS. 2-4, the openings 512 may also be arranged as shown in FIG. 5.

Referring to FIGS. 6 and 7, the LCD apparatus 700 includes the backlight assembly 100, a display unit 800, an inverter 900 and a top chassis 950. The backlight assembly 100 provides the display unit 800 with light. The display unit 800 displays images using light generated from the backlight assembly 100. The inverter 900 generates driving voltages to drive lamps 200 of the backlight assembly 100. The top chassis 950 fixes the display unit 800 to the backlight assembly 100.

The display unit 800 includes an LCD panel 810 that displays the images, a data printed circuit board ("PCB") 820 and a gate PCB 830. The data PCB 820 and the gate PCB 830 generate driving signals to drive the LCD panel 810.

The data PCB 820 and the gate PCB 830 are electrically connected to the LCD panel 810 through a data flexible printed circuit board ("FPC") 840 and a gate FPC 850, respectively. The driving signals are applied to the LCD panel 810 through the data FPC 840 and the gate FPC 850. For example, each of the data FPC 840 and the gate FPC 850 may be a tape carrier package ("TCP") or chip on film ("COF"). The data and gate FPCs 840 and 850 include data and gate driver chips 842, 852, respectively. The data and gate driver chips 842, 852 apply the driving signals to LCD panel 810 at proper times.

The LCD panel 810 includes a thin film transistor ("TFT") substrate 812, a color filter substrate 814 coupled to the TFT substrate 812 and a liquid crystal layer 816 interposed between the TFT substrate 812 and the color filter substrate 814.

In an exemplary embodiment, the TFT substrate 812 is a transparent glass substrate on which TFTs are formed in a matrix configuration. Each of the TFTs has a source electrode electrically connected to a data line, a gate electrode electrically connected to a gate line and a drain electrode electrically connected to a pixel electrode (not shown) that is a transparent and conductive material.

The color filter substrate 814 includes red (R), green (G) and blue (B) color filters (not shown). The RGB color filters (not shown) are formed through a thin film process. The color filter substrate 814 further includes a common electrode (not shown) on the RGB color filters (not shown). The common electrode (not shown) is a transparent and conductive material.

When a power is applied to the gate electrode of each of the TFTs, the TFT is turned on so that an electric field is formed between the pixel electrode of the TFT substrate 812 and the common electrode (not shown) of the color filter substrate 814. The electric field alters an arrangement of liquid crystal molecules of the liquid crystal layer 816 interposed between the TFT substrate 812 and the color filter substrate 814. Thus, a light transmittance of the liquid crystal layer 816 is altered relative to the variation of the arrangement of the liquid crystal molecules, so that a desired image may be obtained.

The inverter 900 is on a rear face of the receiving container 300, and generates the driving voltages to drive the lamps 200. The inverter 900 transforms a low level voltage that is provided from outside of the inverter 900 into a high level voltage corresponding to the driving voltages. The driving voltages generated from the inverter 900 are applied to the lamps 200 through a first lamp wire 910 and a second lamp wire 920. A first end portion of the lamp 200 is electrically connected to the inverter 900 through the first lamp wire 910, and a second end portion of the lamp 200 is electrically connected to the inverter 900 through the second lamp wire 920. The inverter 900 may be positioned adjacent first end portions of the lamps 200 and the second lamp wire 920 may pass through the inverted U-shaped cross-section of the side portions 320 to reach the second end portions of the lamps 200.

The top chassis 950 surrounds side portions of the LCD panel 810 and is combined with the receiving container 300. The top chassis 950 protects the LCD panel 810 from an impact and an impurity that are provided from an exterior of the LCD apparatus 700, and prevents the LCD panel 810 from drifting relative to the receiving container 300.

The receiving container 300 may have a first stepped portion 300a to guide the diffuser plate 400 and the optical sheet 410. Also, the receiving container 300 may also have a second stepped portion 300b to guide the LCD panel 810. Alternatively, the LCD apparatus 700 may further include an extra fixing member (not shown) that is disposed between the optical sheet 410 and the LCD panel 810. The extra fixing member fixes the diffuser plate 400 and the optical sheet 410, and guides the LCD panel 810.

According to the backlight assembly and the LCD apparatus of the present invention, the opening of the lamp holding portion is inclined by a predetermined angle with respect to a normal line of the bottom portion of the receiving container so that the lamp is securely combined with the lamp holding portion, and an impact resistance of the backlight assembly is improved.

Also, the opening width of the opening is increased so that the lamp is easily assembled.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   lamps generating a light;
   a receiving container receiving the lamps, the receiving container including a bottom portion and a side portion protruded from a side of the bottom portion;
   a diffuser plate disposed over the lamps to diffuse the light generated from the lamps; and
   holding members engaged with the bottom portion, each of the holding members having a lamp holding portion that holds corresponding one of the lamps, each lamp holding portion having an opening for receiving corresponding one of the lamps, the opening being inclined by a first angle with respect to a normal line of the bottom portion, wherein the first angle is within a range of about 5° to about 60° and an opening width of the opening is within a range of about 80% to about 90% of a diameter of one of the lamps.

2. The backlight assembly of claim 1, wherein each of the holding members further comprises a diffuser plate supporting portion that supports the diffuser plate.

3. The backlight assembly of claim 2, wherein each of the holding members includes lamp holding portions.

4. The backlight assembly of claim 3, wherein the diffuser plate supporting portion is disposed between the lamp holding portions.

5. The backlight assembly of claim 4, wherein a first opening in a first lamp holding portion in a first holding member is inclined in a first direction and a second opening in a second lamp holding portion in the first holding member is inclined in a second direction, wherein the first direction is inclined in an opposite direction to the second direction with respect to the diffuser plate supporting portion.

6. The backlight assembly of claim 4, wherein a first opening in a first lamp holding portion in a first holding member is inclined in a first direction, and a second opening in a second lamp holding portion in the first holding member is also inclined in the first direction.

7. The backlight assembly of claim 1, wherein the first angle is about 30°.

8. The backlight assembly of claim 1, wherein each of the lamps is removably fixed to a plurality of holding members.

9. The backlight assembly of claim 1, wherein the holding members are arranged in a zigzag shape along a direction substantially perpendicular to a longitudinal direction of the lamps.

10. The backlight assembly of claim 9 wherein a first holding member for a first lamp is spaced a first distance from the side portion of the receiving container, a second holding member for a second lamp is spaced a second distance from the side portion of the receiving container, wherein the first distance is different than the second distance.

11. The backlight assembly of claim 1, further comprising:
    a reflecting plate on the bottom portion to reflect the light generated from the lamps; and
    a side mold combined with the receiving container to cover an end portion of the lamps.

12. A liquid crystal display apparatus comprising:
    a backlight assembly including:
      lamps generating a light;
      a receiving container that receives the lamps, the receiving container including a bottom portion and a side portion protruded from a side of the bottom portion;
      a diffuser plate disposed over the lamps for diffusing the light generated from the lamps; and
      holding members engaged with the bottom portion, each of the holding members having a lamp holding portion that holds corresponding one of the lamps, the lamp holding portion having an opening for receiving corresponding one of the lamps, the opening being inclined by a first angle with respect to a normal line of the bottom portion;
    a liquid crystal display panel that displays an image using the light from the backlight assembly;
    an inverter that generates driving voltages for driving the lamps; and
    a top chassis that fixes the liquid crystal display panel to the backlight assembly, wherein the first angle is within a range of about 5° to about 60° and an opening width of the opening is within a range of about 80% to about 90% of a diameter of one of the lamps.

13. The liquid crystal display apparatus of claim 12, wherein each of the holding members further comprises a diffuser plate supporting portion that supports the diffuser plate.

14. The liquid crystal display apparatus of claim 13, wherein each of the holding members includes lamp holding portions, and the diffuser plate supporting portion is disposed between the lamp holding portions.

15. The liquid crystal display apparatus of claim 14, wherein a first opening in a first lamp holding portion in a first holding member is inclined in a same direction as a second opening in a second lamp holding portion in the first holding member.

16. The liquid crystal display apparatus of claim 12, wherein the first angle is about 30°.

17. The liquid crystal display apparatus of claim 12, wherein the holding members are arranged in a zigzag shape along a direction substantially perpendicular to a longitudinal direction of the lamps.

18. The liquid crystal display apparatus of claim 17, wherein a first holding member for a first lamp is spaced a first distance from the side portion of the receiving container, a second holding member for a second lamp is spaced a second distance from the side portion of the receiving container, wherein the first distance is different than the second distance.

19. A lamp holding member for a backlight assembly, the lamp holding member comprising:
    a first lamp holding portion having a first opening, a first jaw, and a second jaw, the first jaw spaced from the second jaw by a first distance in a biased condition, the first jaw and the second jaw separable by a second distance greater than the first distance for allowing entry of a lamp through the first opening;
    a connecting bar, the first lamp holding portion extending from the connecting bar; and
    a second lamp holding portion extending from the connecting bar;
    wherein the first jaw has a shorter length than a length of the second jaw for offsetting the first opening from a line perpendicular to a bottom portion of the backlight assembly, and the first opening of the first lamp holding portion and a second opening of the second lamp holding portion are inclined within a range of about 5° to about 60° with respect to a line perpendicular to the connecting bar, and the first distance is within a range of about 80% to about 90% of a diameter of a lamp insertable within the first lamp holding portion.

20. The lamp holding member of claim 19, further comprising a diffuser plate supporting portion extending from the connecting bar, the diffuser plate supporting portion positioned between the first lamp holding portion and the second lamp holding portion, wherein a distance from an end of the diffuser plate supporting portion to the connecting bar is greater than a distance from an end of the first lamp holding portion to the connecting bar.

21. The lamp holding member of claim 20, wherein the first opening is inclined in a first direction from the line perpendicular to the connecting bar, and the second opening is inclined in a second direction, opposite the first direction, from the line perpendicular to the connecting bar.

22. The lamp holding member of claim 19, wherein the first distance is within a range of about 80% to about 90% of a diameter of a lamp insertable within the first lamp holding portion.

23. The lamp holding member of claim 19, further comprising at least four lamp holding portions.

24. The lamp holding member of claim 19, wherein the first lamp holding portion extends from a first surface of the connecting bar, the lamp holding member further comprising a combining portion extending from a second surface of the connecting bar, the second surface opposite the first surface.

25. The lamp holding member of claim 24, wherein the combining portion includes a prong and a retaining portion, the prong sized for passing through an aperture within a bottom portion of a receiving container of the backlight assembly and the retaining portion sized for preventing escape of the prong from the aperture.

* * * * *